United States Patent
Lesso et al.

(10) Patent No.: US 11,024,318 B2
(45) Date of Patent: *Jun. 1, 2021

(54) SPEAKER VERIFICATION

(71) Applicant: Cirrus Logic International Semiconductor Ltd., Edinburgh (GB)

(72) Inventors: John Paul Lesso, Edinburgh (GB); Gordon Richard McLeod, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/685,264

(22) Filed: Nov. 15, 2019

(65) Prior Publication Data
US 2020/0082831 A1    Mar. 12, 2020

Related U.S. Application Data

(63) Continuation of application No. 15/992,562, filed on May 30, 2018, now Pat. No. 10,540,978.

(51) Int. Cl.
    *G10L 17/04*      (2013.01)
    *G10L 17/06*      (2013.01)

(52) U.S. Cl.
    CPC ............. *G10L 17/04* (2013.01); *G10L 17/06* (2013.01)

(58) Field of Classification Search
    CPC .......... G10L 17/04; G10L 17/06; G10L 17/12
    See application file for complete search history.

(56) References Cited

U.S. PATENT DOCUMENTS

| | | | |
|---|---|---|---|
| 5,946,654 A | 8/1999 | Newman et al. | |
| 6,389,392 B1* | 5/2002 | Pawlewski | G06K 9/6255 704/241 |
| 2007/0100622 A1 | 5/2007 | Tavares | |
| 2008/0195387 A1* | 8/2008 | Zigel | G10L 17/06 704/236 |

(Continued)

FOREIGN PATENT DOCUMENTS

EP      3016314 A1      5/2016

OTHER PUBLICATIONS

International Search Report and Written Opinion of the International Searching Authority, International Application No. PCT/GB2019/051449, dated Jul. 22, 2019.

(Continued)

*Primary Examiner* — Huyen X Vo
(74) *Attorney, Agent, or Firm* — Jackson Walker L.L.P.

(57) ABSTRACT

A method of speaker verification comprises: comparing a test input against a model of a user's speech obtained during a process of enrolling the user; obtaining a first score from comparing the test input against the model of the user's speech; comparing the test input against a first plurality of models of speech obtained from a first plurality of other speakers respectively; obtaining a plurality of cohort scores from comparing the test input against the plurality of models of speech obtained from a plurality of other speakers; obtaining statistics describing the plurality of cohort scores; modifying said statistics to obtain adjusted statistics; normalising the first score using the adjusted statistics to obtain a normalised score; and using the normalised score for speaker verification.

17 Claims, 7 Drawing Sheets

(56) References Cited

U.S. PATENT DOCUMENTS

2010/0198598 A1* 8/2010 Herbig .................... G10L 15/07
704/240
2017/0236520 A1* 8/2017 Borgstrom .............. G10L 17/04
704/239
2018/0293988 A1* 10/2018 Huang .................... G10L 17/20

OTHER PUBLICATIONS

Büyük, Osman et al., Model Selection and Score Normalization for Text-Dependent Single Utterance Speaker Verification, Turk J. Elec. Eng. & Comp. Sci., vol. 20, No. Sup. 2, 2012, p. 1286, paragraph 4.1—p. 1288.
Combined Search and Examination Report under Sections 17 and 18(3), UKIPO, Application No. GB1811775.4, dated Jan. 7, 2019.
Poh et al., "F-ratio client dependent normalisation for biometric authentication tasks," Proceedings. (ICASSP '05). IEEE International Conference on Acoustics, Speech, and Signal Processing, 2005, Philadelphia, PA 2005, pp. I/721-I/724 vol. 1, See Section 2.
Poh et al., "On the User of Log-Likelihood Ratio Based Model-Specific Score Normalisation in Biometric Authentication", Advances in Biometrics. ICB 2007. Lecture Notes in Computer Science, pp. 614-624, vol. 4642, see pp. 616 and 618.

* cited by examiner

SPEAKER VERIFICATION

The present disclosure is a continuation of U.S. Non-Provisional patent application Ser. No. 15/992,562, filed May 30, 2018, which is incorporated by reference herein in its entirety.

TECHNICAL FIELD

The embodiments described herein relate to a method and system for use in speaker verification, for determining whether a test speech input was provided by an enrolled user.

BACKGROUND OF THE INVENTION

It is known to perform speaker verification by first performing a process of enrolling a user to obtain a model of the user's speech. Then, when it is desired to determine whether a particular test input is the speech of that user, a first score is obtained by comparing the test input against the model of the user's speech. In addition, a process of score normalization may be performed. For example, the test input may also be compared against a plurality of models of speech obtained from a plurality of other speakers. These comparisons give a plurality of cohort scores, and statistics can be obtained describing the plurality of cohort scores. The first score can then be normalized using the statistics to obtain a normalized score, and the normalized score can be used for speaker verification.

However, the statistics describing the cohort scores will be heavily dependent on the other speakers whose speech was used to form the plurality of models, and this may give undesirable results, particularly when the test input is not well matched to the other speakers.

SUMMARY OF THE INVENTION

According to the embodiments described herein, there is provided a method and a system which reduce or avoid one or more of the disadvantages mentioned above.

According to a first aspect of the invention, there is provided a method of speaker verification, comprising: comparing a test input against a model of a user's speech obtained during a process of enrolling the user; obtaining a first score from comparing the test input against the model of the user's speech; comparing the test input against a first plurality of models of speech obtained from a first plurality of other speakers respectively; obtaining a plurality of cohort scores from comparing the test input against the plurality of models of speech obtained from a plurality of other speakers; obtaining statistics describing the plurality of cohort scores; modifying said statistics to obtain adjusted statistics; normalising the first score using the adjusted statistics to obtain a normalised score; and using the normalised score for speaker verification.

According to an aspect of the invention, there is provided a system, comprising: an input, for receiving audio signals representing speech; and wherein the system is configured for: comparing a test input against a model of a user's speech obtained during a process of enrolling the user; obtaining a first score from comparing the test input against the model of the user's speech; comparing the test input against a first plurality of models of speech obtained from a first plurality of other speakers respectively; obtaining a plurality of cohort scores from comparing the test input against the plurality of models of speech obtained from a plurality of other speakers; obtaining statistics describing the plurality of cohort scores; modifying said statistics to obtain adjusted statistics; normalising the first score using the adjusted statistics to obtain a normalised score; and using the normalised score for speaker verification.

According to another aspect of the invention, there is provided a device comprising such a speaker recognition system. The device may comprise a mobile telephone, an audio player, a video player, a mobile computing platform, a games device, a remote controller device, a toy, a machine, or a home automation controller or a domestic appliance.

The invention also provides a non-transitory computer readable storage medium having computer-executable instructions stored thereon that, when executed by processor circuitry, cause the processor circuitry to perform any of the methods set out above.

According to a second aspect of the invention, there is provided a method of calibrating a system for speaker verification, the method comprising, for each of a plurality of test utterances: comparing the test utterance against a plurality of models of speech obtained from a plurality of other speakers respectively; obtaining a plurality of cohort scores from comparing the test input against the plurality of models of speech; and calculating a standard deviation of the plurality of cohort scores; forming an average of said standard deviations calculated for each of the plurality of test utterances, and storing said average of said standard deviations as a prior tuning factor for use in modifying statistics obtained during speaker verification.

This process of normalization using adjusted statistics is therefore more stable, and less dependent on the other speakers whose speech was used to form the plurality of models. This may allow a smaller cohort of such speakers to be used, with the result that fewer computations need to be performed for each attempt at speaker verification.

According to a further aspect of the invention, there is provided a method of biometric verification, comprising:
comparing a test input against a biometric model of a user obtained during a process of enrolling the user;
obtaining a first score from comparing the test input against the biometric model of the user;
comparing the test input against a first plurality of biometric models obtained from a first plurality of other persons respectively;
obtaining a plurality of cohort scores from comparing the test input against the plurality of biometric models obtained from the plurality of other persons;
obtaining statistics describing the plurality of cohort scores;
modifying said statistics to obtain adjusted statistics;
normalising the first score using the adjusted statistics to obtain a normalised score; and
using the normalised score for biometric verification.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
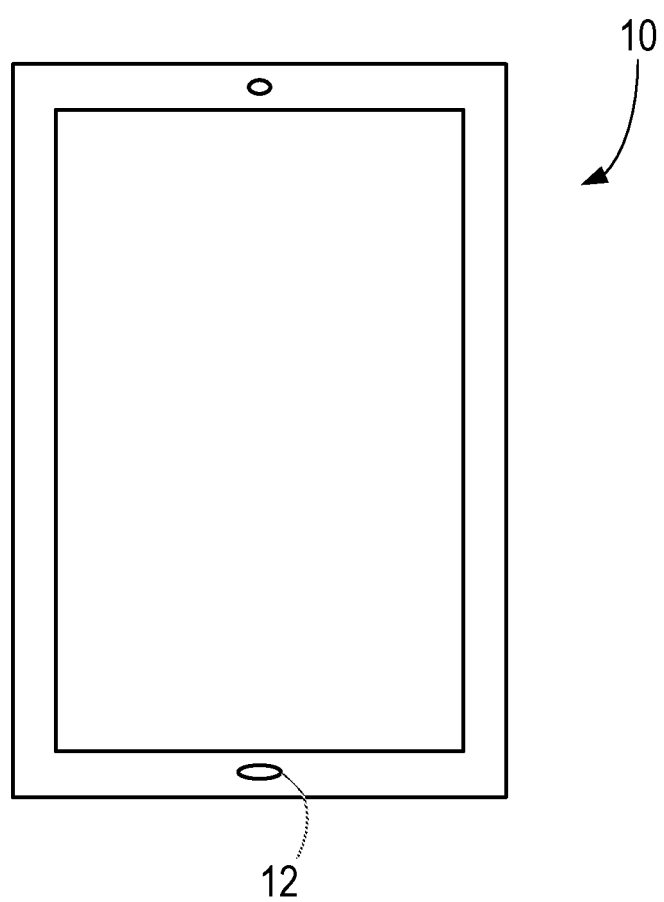
FIG. 1 is a schematic view of an electronic device.

FIG. 1 shows a device in accordance with one aspect of the invention. The device may be any suitable type of device, such as a mobile computing device, for example a laptop or tablet computer, a games console, a remote control device, a home automation controller or a domestic appliance including a domestic temperature or lighting control system, a toy, a machine such as a robot, an audio player, a video player, or the like, but in this illustrative example the device is a mobile telephone, and specifically a smartphone 10, having a microphone 12 for detecting sounds. The smartphone 10 may, by suitable software, be used as the control interface for controlling any other further device or system.

Figure 2:
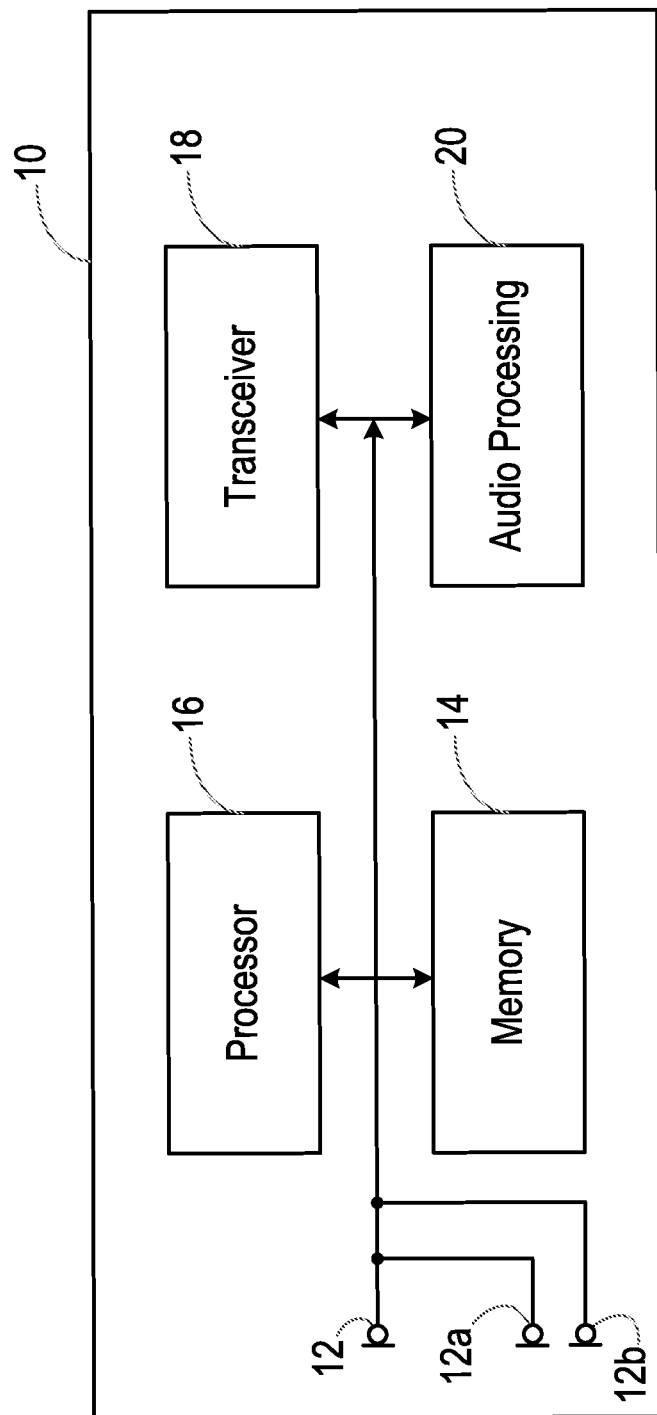
FIG. 2 is a further schematic diagram of an electronic device.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12*a*, 12*b*, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

Thus, the memory 14 may act as a tangible computer-readable medium, storing code, for causing the processor 16 to perform methods as described below.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with speaker recognition functionality, and with control functionality. Thus, the smartphone 10 is able to perform various functions in response to spoken commands from an enrolled user. The speaker recognition functionality is able to distinguish between spoken commands from an enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the speaker recognition functionality is performed in the device that is intended to carry out the spoken command. Certain other embodiments relate to systems in which the speaker recognition functionality is performed on a smartphone or other device, which then transmits the commands to a separate device if the speaker recognition functionality is able to confirm that the speaker was an enrolled user.

In some embodiments, while speaker recognition functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

When a spoken command is received, it is often required to perform a process of speaker verification, in order to confirm that the speaker is an enrolled user of the system. It is known to perform speaker verification by first performing a process of enrolling a user to obtain a model of the user's speech. Then, when it is desired to determine whether a particular test input is the speech of that user, a first score is obtained by comparing the test input against the model of the user's speech. In addition, a process of score normalization may be performed. For example, the test input may also be compared against a plurality of models of speech obtained from a plurality of other speakers. These comparisons give a plurality of cohort scores, and statistics can be obtained describing the plurality of cohort scores. The first score can then be normalized using the statistics to obtain a normalized score, and the normalised score can be used for speaker verification.

As described in more detail below, the process of normalization is adapted, to take account of the plurality of other speakers that have been chosen. As an initial step in that process of normalization, a prior tuning factor is obtained, based on the other speakers that have been chosen. Specifically, this prior tuning factor is obtained by comparing multiple examples of speech with models of the speech of those other speakers.

Figure 3:
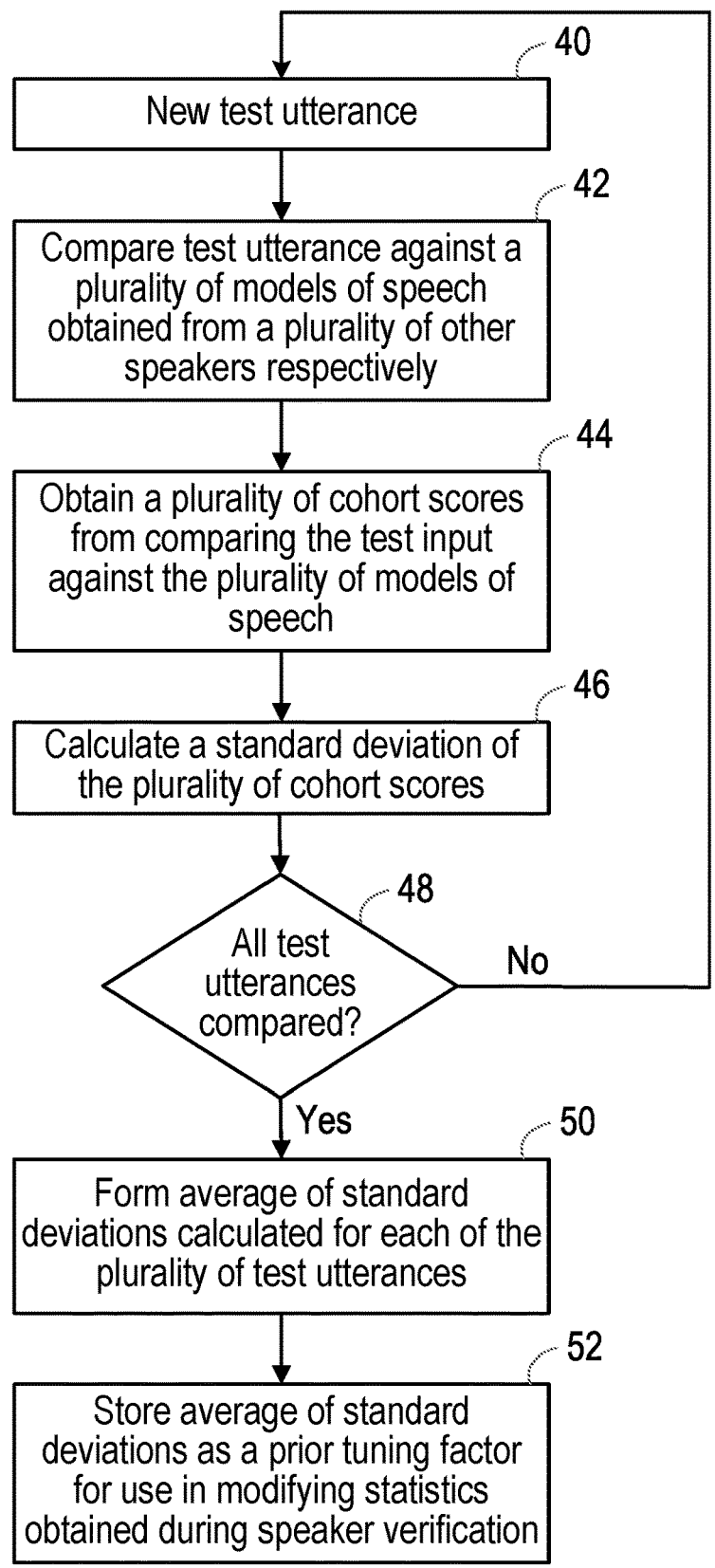
FIG. 3 is a flow chart, illustrating a method.
Figure 4:
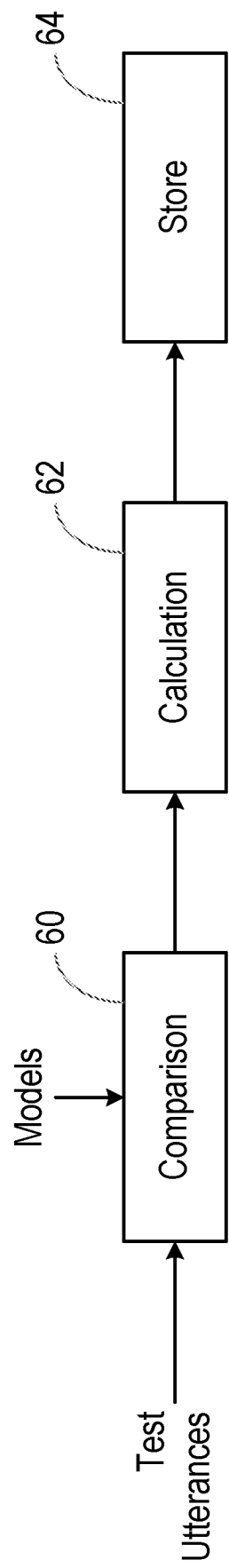
FIG. 4 is a block diagram, illustrating a processing system.

FIG. 3 is a flow chart illustrating a method of calibration of a system for speaker verification, and specifically obtaining this prior tuning factor, and FIG. 4 is a block diagram illustrating the form of the relevant parts of a system for speaker verification.

As mentioned above, the process shown in FIG. 3 uses the speech of multiple other speakers. Specifically, for each of the multiple other speakers, a model of that speaker's speech is formed.

In addition, multiple test utterances, that is, examples of speech in the same form as the speech that is expected to be received during the speaker verification process, are used.

In step 40, of the process shown in FIG. 3, one of these test utterances is selected. The test utterance is passed to a comparison block 60 shown in FIG. 4, which is also able to access the plurality of models of the other speakers.

In step 42, the test utterance is compared against the plurality of models of speech obtained from the plurality of other speakers respectively. Thus, in step 42, a plurality of cohort scores are obtained, from comparing the test utterance against the plurality of models of speech. These scores are passed to a calculation block 62 shown in FIG. 4.

Then, statistics are obtained from the plurality of cohort scores. In one embodiment described here, in step 46 of the process shown in FIG. 3, a standard deviation of the scores is calculated.

In step 48, it is determined whether all of the available test utterances have been compared with the plurality of speech models. If they have not, the process returns to step 40, and a new test utterance is selected. Then, steps 42, 44, 46, and 48 are performed again.

When it is determined in step 48 that all of the available test utterances have been compared with the plurality of speech models, the process passes to step 50, in which an average of the calculated statistics is calculated. For example, in the embodiment in which the statistic calculated in step 46 is the standard deviation, the average calculated in step 50 may be the mean value of the previously obtained standard deviations that were calculated for each of the plurality of test utterances.

In step 52, this average of the standard deviations is stored in a store 64 as shown in FIG. 4. As described in more detail below, the stored average standard deviation is used subsequently as a prior tuning factor for use in modifying statistics obtained during speaker verification.

Thus, the process shown in FIG. 3 obtains the prior tuning factor, on the basis of a particular set of other speakers. The intention is that this particular set of other speakers may contain more speakers, and possibly very many more speakers, than the set of other speakers that are used to obtain the cohort scores during the subsequent process of speaker verification.

For example, a manufacturer of devices such as the smartphone 10 may load the memory 14 with models of the speech of multiple speakers, for use during a speaker verification process. Each received voice input is compared with each one of these models. Therefore, in order to save time and energy required for the calculations, the number of models may be of the order of 10-100.

However, the manufacturer may perform the process shown in FIG. 3 using the models of the speech of very many more models, for example from 3000-30,000 speakers, and may obtain the prior tuning factor from this much larger number of models for use in speaker verification. The process shown in FIG. 3 may be performed only once, with the resulting calculated prior tuning factor being used in many separate devices.

Figure 5:
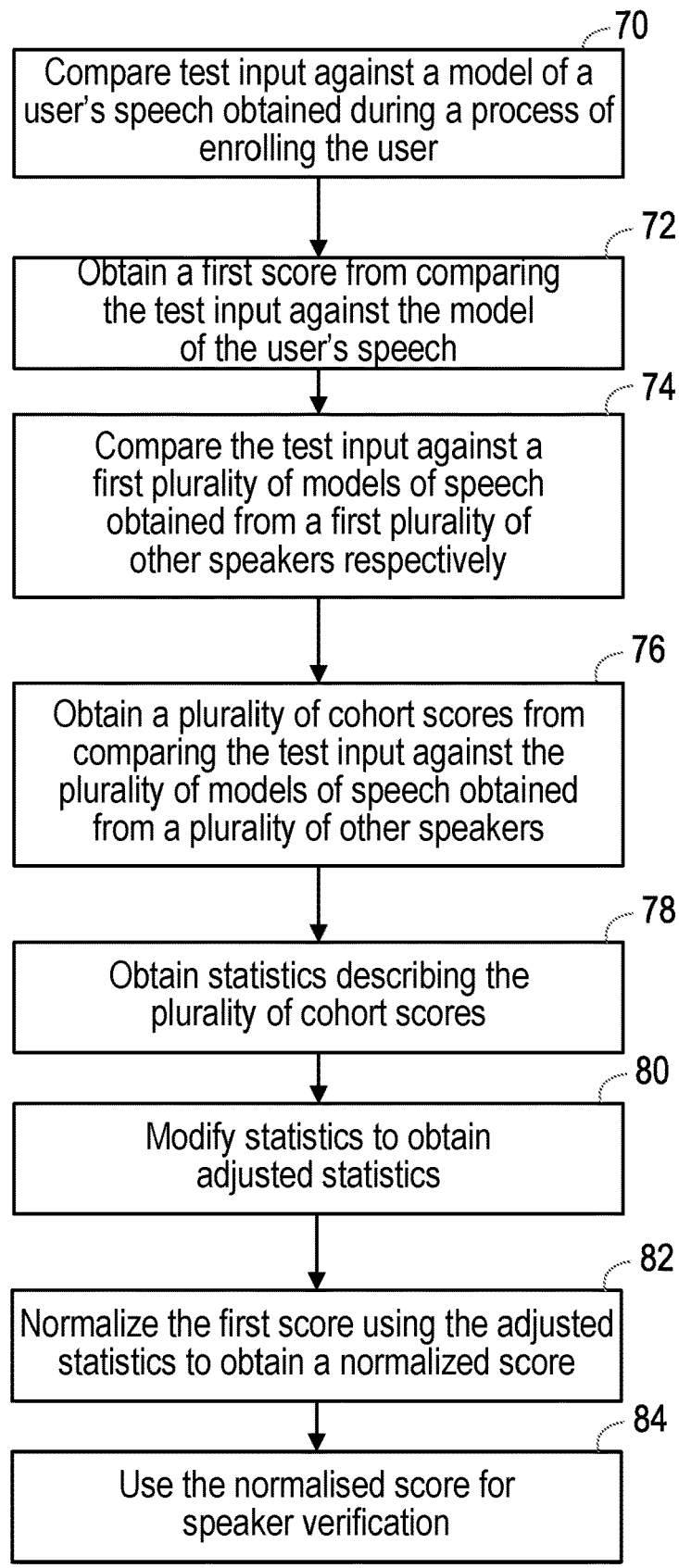
FIG. 5 is a flow chart, illustrating an alternative method.
Figure 6:
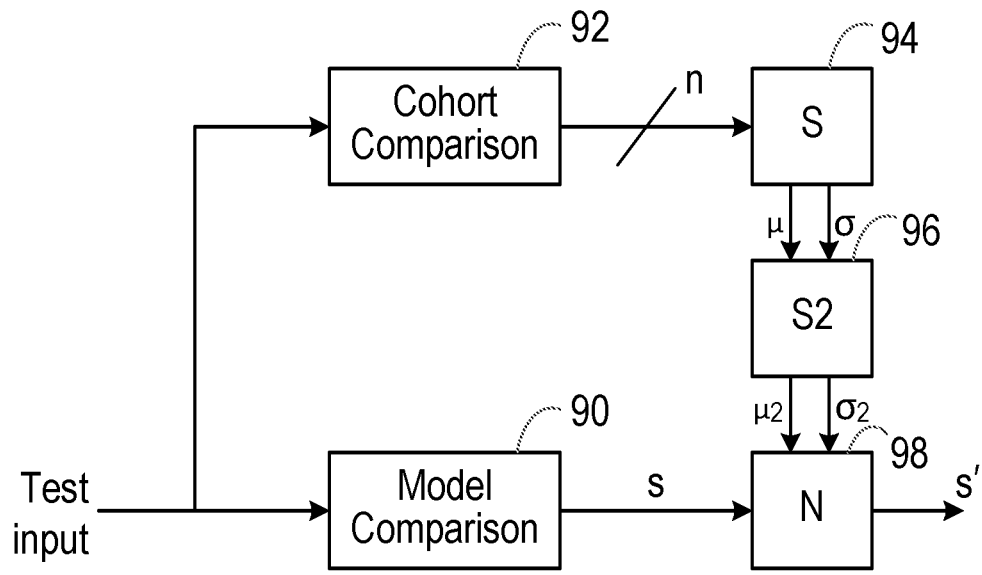
FIG. 6 is a block diagram, illustrating a processing system.

FIG. 5 is a flow chart illustrating a method of speaker verification, and FIG. 6 is a block diagram illustrating the form of the relevant parts of a system for speaker verification.

In the method shown in FIG. 5, it is assumed that a user has already enrolled in the system, that is, that a model of the user's speech has been formed, and also that a plurality of models of the speech of a plurality of other speakers have been obtained and stored. As described above, a process similar to that shown in FIG. 3 has also been performed using the same plurality of models of the speech of other speakers, in order to obtain a prior tuning factor that is used in the method of speaker verification as described below.

The process starts when a user speaks, for example when a spoken trigger phrase or command is detected, and it is desired to determine whether the speaker is the enrolled user. A test input is obtained from an electrical signal representing the user's speech. For example, this test input may be obtained by dividing the signal into frames, and extracting features of the signal, so that it is in a form that is suitable for comparison with the speech models that are used in this example. In step 70 of the process, the test input is passed to a model comparison block 90, where it is compared against the model of the user's speech that was obtained during the process of enrolling the user.

In step 72, this comparison is used to obtain a first score s from comparing the test input against the model of the user's speech.

In step 74, of the process, the test input is passed to a cohort comparison block 92, where it is compared against a first plurality of models of speech obtained from a first plurality of other speakers respectively.

In step 76, these comparisons are used to obtain a plurality of cohort scores. That is, each comparison against the model of speech obtained from one other speaker gives rise to a cohort score, and the comparison with the plurality of models is used to obtain a plurality of cohort scores. The number of other models that are used is referred to here as n.

In step 78, the calculated cohort scores are passed to a statistics calculation (S) block 94, and statistics are obtained describing the plurality of cohort scores.

In step 80, the calculated statistics describing the cohort scores are passed to a statistics modification (S2) block 96, and the statistics describing the plurality of cohort scores are modified to obtain adjusted statistics.

In one embodiment, the statistics describing the plurality of cohort scores, which are obtained in step 78, comprise a mean and a measure of dispersion. In that case, the adjusted statistics obtained in step 80 may comprise at least one of an adjusted mean and an adjusted measure of dispersion. The adjusted statistics may comprise a mean that is equal to the mean of the plurality of cohort scores.

The measure of dispersion that is obtained may be a standard deviation of the cohort scores. In that case, the adjusted measure of dispersion that is calculated in step 80 may be an adjusted standard deviation.

In another embodiment, the statistics describing the plurality of cohort scores, which are obtained in step 78, comprise a median and a median absolute deviation. Other statistics may also be used as required.

Figure 7:
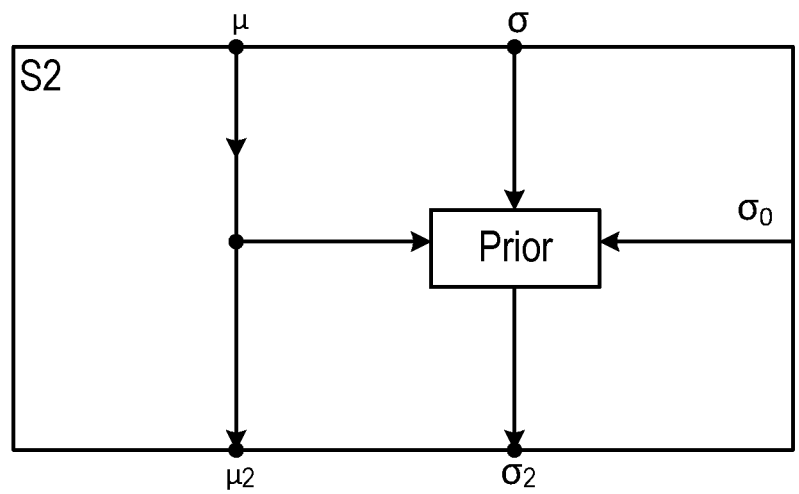
FIG. 7 is a block diagram, further illustrating a part of the system of FIG. 6.

FIG. 7 is a block diagram illustrating one possible form of the statistics modification block 96.

In this embodiment, the statistics describing the plurality of cohort scores, which are obtained in step 78, comprise a mean value p of the cohort scores, and a standard deviation a of the cohort scores.

As shown in FIG. 7, the adjusted statistics comprise a mean value $\mu_2$ that is equal to the mean $\mu$ of the plurality of cohort scores. The adjusted statistics also comprise a standard deviation value $\sigma_2$, which may be a function of the standard deviation a of the cohort scores and may also be a function of the mean value µ of the cohort scores.

In one specific embodiment, the adjusted standard deviation $\sigma_2$ of the adjusted statistics is formed from the standard deviation a of the plurality of cohort scores and a prior tuning factor $\sigma_0$. More specifically, in this embodiment, the prior tuning factor $\sigma_0$ is the average of the standard deviations calculated for each of the plurality of test utterances, in step 50 of the process shown in FIG. 3.

The adjusted standard deviation $\sigma_2$ may be calculated in any suitable way, for example as:

$$\sigma_2^2 = \gamma \sigma_0^2 + (1-\gamma)\sigma^2$$

where:

$$\gamma = \frac{\tau}{n+\tau}$$

$\tau$ is a factor (with a default value of $\tau=1$) that can be chosen to give a value of $\gamma$ that is determined by experimentation to give a suitable adjusted standard deviation $\sigma_2$.

(Or, stated differently, $\gamma$ is a coefficient of proportionality that can be determined by experimentation or may be calculated using a standard Bayesian MAP approach).

$\sigma$ is the standard deviation of the plurality of cohort scores, $\sigma_0$ is the prior tuning factor, and n is a pseudocount (commonly the number of cohort scores used).

One alternative to the above method of calculating the adjusted standard deviation $\sigma_2$ is:

$$\sigma_2^2 = \gamma \sigma_0^2(\mu) + (1-\gamma)\sigma^2$$

with $\sigma_0^2$ being a function of $\mu$.

In other embodiments, as mentioned above, the adjusted statistics may also include an adjusted value of the mean $\mu$. In this case, the adjusted mean $\mu_2$ could be calculated similar to the above formula, i.e.:

$$\mu_2^2 = \gamma \mu_0^2 + (1-\gamma)\mu^2$$

where $\gamma$ is as defined above, $\mu$ is the mean of the plurality of cohort scores, and $\mu_0$ is a prior tuning factor for the mean.

Thus, in this embodiment, the prior tuning factor $\sigma_0$ (and, where appropriate, $\mu_0$) is calculated off-line, using test utterances, and the same value of the tuning factor is used in all speaker verification attempts.

In other embodiments, the prior tuning factor is obtained by measuring a property of the test input, and selecting the prior tuning factor based on the measured property.

In one such example, the property of the test input is a signal-to-noise ratio, and so the prior tuning factor is selected based on the measured signal-to-noise ratio of the test input. In another example, the property of the test input is the type of noise present, for example the spectral shape of the noise, or statistics relating to the noise, or information about the noise source (for example whether the noise is impulsive, periodic, or the like) and so the prior tuning factor is selected based on the type of noise present in the test input.

Figure 8:
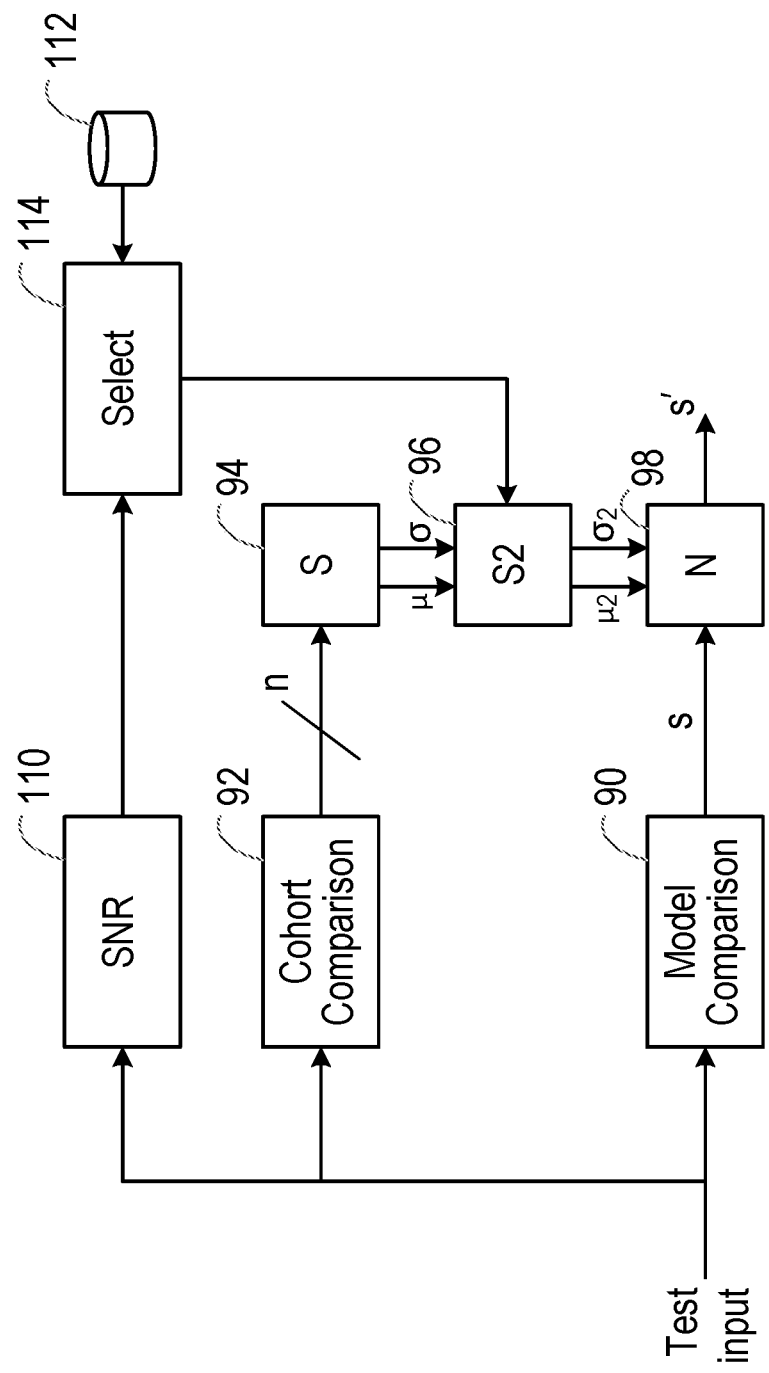
FIG. 8 is a block diagram, illustrating an alternative processing system.

FIG. 8 is a block diagram of the relevant parts of such a system for speaker verification. The system of FIG. 8 is similar in some respects to FIG. 6, and corresponding components thereof are indicated by the same reference numerals.

In the system of FIG. 8, the test input is also passed to a signal-to-noise ratio (SNR) measurement block 110, which measures the signal-to-noise ratio of the test input.

A memory 112 stores multiple possible values of the prior tuning factor, and a selection block 114 selects one of these on the basis of the measured signal-to-noise ratio. Lower, that is, worse, values of the SNR result in a larger spread of results when the test input is compared with the cohort models, and so the variance of these results is higher. Accordingly, the value of the prior tuning factor that is used is higher, for lower values of the SNR.

As an alternative to this, or in addition, the property of the test input is a measure of vocal effort. Thus, if it is determined that the speaker is using a relatively high vocal effort, a different value of the prior tuning factor may be used.

In addition, the method of adjusting the statistics may further comprise applying a maximum and/or minimum value to the adjusted standard deviation $\sigma_2$ and/or the adjusted mean $\mu_2$, if the calculated value thereof exceeds the maximum value or lies below the minimum value.

In step 82, the first score obtained in step 72 is passed to a normalization (N) block 98, and is normalized using the adjusted statistics to obtain a normalised score.

The step of normalizing the first score may comprise subtracting the mean of the adjusted statistics from the first score, and dividing the result by the standard deviation of the adjusted statistics.

That is, the normalised score s' may be given by the following equation:

$$s' = (s-\mu_2)/\sigma_2,$$

where:

s is the first score obtained in step 72, $\mu_2$ is the mean value of the adjusted statistics, and $\sigma_2$ is the standard deviation value of the adjusted statistics.

In step 84, the normalized score is used for speaker verification. For example, as is conventional, the score may be compared with a threshold value, which has been chosen to ensure an appropriate balance between a False Rejection Rate and a False Acceptance Rate. If the score exceeds the threshold value, it is accepted that the speech is that of the enrolled user, and otherwise the speaker is rejected.

A False Rejection is inconvenient for the user, and so it is preferable to minimize the False Rejection Rate. However, minimizing the False Rejection Rate typically involves setting a threshold value that increases the False Acceptance Rate. A False Acceptance means that the system accepts an unauthorized person as an enrolled user. Therefore, although there are low security applications in which a False Acceptance is trivial, there are other applications in which security is important, for example financial applications, and here the threshold value must be set such that it minimizes the False Acceptance Rate.

The normalization process described above is stable and robust, meaning that a threshold value can be set to achieve the intended balance between the False Rejection Rate and the False Acceptance Rate, without needing to attempt to compensate for instabilities in the variance value used during normalization.

In the examples given above, the statistics describing the plurality of cohort scores comprise a mean and a standard deviation. Equivalently, however, the statistics describing the plurality of cohort scores may comprise a gain and a shift, where the gain is defined as the reciprocal of a standard deviation of the cohort scores, and where the shift comprises a ratio of a mean of the cohort scores to the standard deviation of the cohort scores. In that case, the adjusted statistics may comprise an adjusted gain and an adjusted shift.

In the embodiments described above, the method is described with reference to an example of speaker verification. However, the method is applicable to biometric verification more generally. Thus, in more general terms, there is disclosed a method of biometric verification. One other example of a suitable biometric relies on the properties of a person's ear. Thus, with a user wearing an earphone in or on their ear, an acoustic stimulus is generated. For example, a predetermined sound may be played through a loudspeaker in the earphone. Then, the acoustic response of the ear is measured. For example, a microphone in the earphone may detect the resulting acoustic signal. The acoustic response of the ear is characteristic of the person.

The acoustic response may be determined during a process of enrolling a user, and this may be used to form a biometric model. A plurality of biometric models may also be obtained from a plurality of other persons. The biometric model of the enrolling user and the other persons may be any suitable biometric model, based on any suitable biometric measure.

A test input may then be generated at a time when it is required to verify a person's identity. The test input may be compared against the biometric model of a user obtained during a process of enrolling the user, and a first score may be obtained from comparing the test input against the biometric model of the user.

The test input may also be compared against a first plurality of biometric models obtained from a first plurality of other persons respectively, in order to obtain a plurality of cohort scores. The plurality of cohort scores can be used to obtain statistics describing the plurality of cohort scores. The statistics may be the mean and standard deviation, or any of the alternatives described above.

The statistics may then be modified, as described in more detail above, in order to obtain adjusted statistics.

The first score is then normalised, as described in more detail above, using the adjusted statistics, in order to obtain a normalised score.

This normalised score can then be used for biometric verification.

Thus, the process of biometric verification is able to perform normalization in a robust and stable way that allows a suitable threshold to be set for the scoring stage.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker verification, comprising:
comparing a test input against a model of a user's speech obtained during a process of enrolling the user;
obtaining a first score from comparing the test input against the model of the user's speech;
comparing the test input against a first plurality of models of speech obtained from a first plurality of other speakers respectively;
obtaining a plurality of cohort scores from comparing the test input against the plurality of models of speech obtained from a plurality of other speakers;
obtaining a mean and a measure of dispersion of the plurality of cohort scores;
modifying at least one of the mean and the measure of dispersion to obtain adjusted statistics;
normalising the first score using the adjusted statistics to obtain a normalised score; and
using the normalised score for speaker verification;
wherein modifying at least one of the mean and the measure of dispersion comprises:
calculating at least one of a modified mean and a modified measure of dispersion; and
using a respective maximum value in said adjusted statistics if the modified mean or the modified measure of dispersion is above the respective maximum value, or using a respective minimum value in said adjusted statistics if the modified mean or the modified measure of dispersion is below the respective minimum value.

2. The method according to claim 1, wherein modifying at least one of the mean and the measure of dispersion to obtain adjusted statistics comprises modifying the measure of dispersion, such that the adjusted statistics comprise a mean that is equal to the mean of the plurality of cohort scores and a modified measure of dispersion of the plurality of cohort scores.

3. The method according to claim 1, wherein the measure of dispersion is a standard deviation.

4. The method according to claim 3, wherein normalising the first score comprises subtracting the mean of the adjusted statistics from the first score, and dividing the result by the standard deviation of the adjusted statistics.

5. The method according to claim 3, comprising forming the adjusted standard deviation from the standard deviation of the plurality of cohort scores and a prior tuning factor.

6. The method according to claim 5, comprising calculating the adjusted standard deviation $\sigma_2$ as:

$$\sigma_2^2 = \gamma \sigma_0^2 + (1-\gamma)\sigma^2$$

where:

$$\gamma = \frac{\tau}{n+\tau}$$

$\tau$ is a delay factor,
$\sigma$ is the standard deviation of the plurality of cohort scores,
$\sigma u_0$ is the prior tuning factor, and
n is a pseudocount.

7. The method according to claim 6, wherein the prior tuning factor is obtained by, for each of a plurality of test utterances:
comparing the test utterance against a second plurality of models of speech obtained from a second plurality of other speakers respectively;
obtaining a second plurality of cohort scores from comparing the test input against the second plurality of models of speech;
calculating a standard deviation of the second plurality of cohort scores; and
forming an average of said standard deviations calculated for each of the plurality of test utterances; wherein said average of said standard deviations is taken as the prior tuning factor.

8. The method according to claim 7, wherein the second plurality of other speakers comprises more speakers than the first plurality of other speakers.

9. The method according to claim 6, wherein the prior tuning factor is obtained by:
measuring a property of the test input; and
selecting the prior tuning factor based on the measured property.

10. The method according to claim 9, wherein the property of the test input is a signal-to-noise ratio.

11. The method according to claim 9, wherein the property of the test input is a measure of vocal effort.

12. The method according to claim 9, wherein the property of the test input is a measure of noise level.

13. The method according to claim 9, wherein the property of the test input is a measure of noise type.

14. A speaker verification system, comprising:
an input, for receiving a test input representing speech; and
a processor, wherein the processor is configured for:
comparing a test input against a model of a user's speech obtained during a process of enrolling the user;
obtaining a first score from comparing the test input against the model of the user's speech;
comparing the test input against a first plurality of models of speech obtained from a first plurality of other speakers respectively;
obtaining a plurality of cohort scores from comparing the test input against the plurality of models of speech obtained from a plurality of other speakers;
obtaining a mean and a measure of dispersion of the plurality of cohort scores;
modifying at least one of the mean and the measure of dispersion to obtain adjusted statistics;
normalising the first score using the adjusted statistics to obtain a normalised score; and
using the normalised score for speaker verification;
wherein modifying at least one of the mean and the measure of dispersion comprises:
calculating at least one of a modified mean and a modified measure of dispersion; and
using a respective maximum value in said adjusted statistics if the modified mean or the modified measure of dispersion is above the respective maximum value, or using a respective minimum value in said adjusted statistics if the modified mean or the modified measure of dispersion is below the respective minimum value.

15. A device comprising a speaker recognition system according to claim 14.

16. The device according to claim 15, wherein the device comprises a mobile computing device, a games console, a remote control device, a home automation controller or a domestic appliance, a toy, a machine, an audio player, a video player, or a mobile telephone.

17. A non-transitory tangible computer-readable medium, comprising code, for causing a processor to perform a method comprising:
comparing a test input against a model of a user's speech obtained during a process of enrolling the user;
obtaining a first score from comparing the test input against the model of the user's speech;
comparing the test input against a first plurality of models of speech obtained from a first plurality of other speakers respectively;
obtaining a plurality of cohort scores from comparing the test input against the plurality of models of speech obtained from a plurality of other speakers;
obtaining a mean and a measure of dispersion of the plurality of cohort scores;
modifying at least one of the mean and the measure of dispersion to obtain adjusted statistics;
normalising the first score using the adjusted statistics to obtain a normalised score; and
using the normalised score for speaker verification;
wherein modifying at least one of the mean and the measure of dispersion comprises:
calculating at least one of a modified mean and a modified measure of dispersion; and
using a respective maximum value in said adjusted statistics if the modified mean or the modified measure of dispersion is above the respective maximum value, or using a respective minimum value in said adjusted statistics if the modified mean or the modified measure of dispersion is below the respective minimum value.

* * * * *

UNITED STATES PATENT AND TRADEMARK OFFICE
CERTIFICATE OF CORRECTION

PATENT NO. : 11,024,318 B2
APPLICATION NO. : 16/685264
DATED : June 1, 2021
INVENTOR(S) : Lesso et al.

It is certified that error appears in the above-identified patent and that said Letters Patent is hereby corrected as shown below:

In the Claims

1. In Column 11, Line 27, in Claim 6, delete "$\sigma u_0$" and insert -- $\sigma_0$ --, therefor.

Signed and Sealed this
Twenty-second Day of November, 2022

Katherine Kelly Vidal
*Director of the United States Patent and Trademark Office*